United States Patent [19]
Floreancig

[11] Patent Number: 4,576,802
[45] Date of Patent: Mar. 18, 1986

[54] METHOD OF DISSOLVING IMPURE URANIUM TETRAFLUORIDE

[75] Inventor: Antoine Floreancig, St Genis Laval, France

[73] Assignee: Uranium Pechiney Ugine Kuhlmann, Paris, France

[21] Appl. No.: 519,922

[22] Filed: Aug. 3, 1983

[51] Int. Cl.$^4$ .............................................. C01G 43/00
[52] U.S. Cl. ........................................ 423/20; 423/18; 423/253
[58] Field of Search .................. 423/18, 20, 253, 259, 423/260

[56] References Cited

U.S. PATENT DOCUMENTS

| | | | |
|---|---|---|---|
| 4,247,522 | 1/1981 | Pyman et al. | 423/253 |
| 4,258,012 | 3/1981 | Barreiro et al. | 423/253 |
| 4,412,861 | 11/1983 | Kreuzmann | 423/18 |

Primary Examiner—Edward A. Miller
Attorney, Agent, or Firm—McDougall, Hersh & Scott

[57] ABSTRACT

A method of dissolving impure uranium tetrafluoride in a hot state in a nitric acid solution in the presence of an aluminum compound. For the purpose of obtaining a uranyl nitrate solution which can easily be separated from the solid phase formed during treatment, the dissolving is carried out in two stages at an appropriate temperature. The first stage comprises introducing quantities of nitric acid and of the aluminum compound which are insufficient to dissolve the impure uranium tetrafluoride completely, and keeping the resultant suspension agitated for a period of at least 0.5 hour. The second stage comprises introducing quantities of nitric acid and of the aluminum compound which are at least sufficient to dissolve the uranium not dissolved in the first stage, while keeping the suspension agitated.

12 Claims, No Drawings

METHOD OF DISSOLVING IMPURE URANIUM TETRAFLUORIDE

BACKGROUND OF THE INVENTION

The invention concerns an improved method of obtaining a uranyl nitrate solution by dissolving impure uranium tetrafluoride, by means of a nitric acid solution in the presence of an aluminum compound. The method comprises introducing the two reagents in two treatment stages.

It has already been known for a long time to dissolve $UF_4$ by means of nitric acid and an agent for making fluoride ions complex, the agent comprising an aluminum compound. Thus, French Pat. No. 2,429,746 describes such a process in which uranium tetrafluoride is digested in an acid solution in the presence of such an agent for making fluorides complex, in accordance with the unbalanced equation:

$$UF_4 + 2\ HNO_3 \rightarrow UO_2^{2+} + 2(NO_3^-).$$

The fluoride ions are made complex by the aluminum compound initially introduced, this compound being capable of forming a fluorine complex $AlF_6^{3-}$ which is soluble in the treatment medium.

When impure $UF_4$ is dissolved in a concentrated nitric acid solution in the presence of an aluminum compound, the medium resulting from the treatment is not the uraniferous solution expected but a suspension of fine particles, where the liquid phase contains $NO_3^-$, $UC_2^{2+}$, $AlF_6^{3-}$ ions and impurities, and where most of the solid phase consists of $AlF_3$ and $nH_2O$ in the form of a gel. The gel has the peculiarity of retaining what may be quite a large or small quantity of uranium.

Since a suspension is obtained instead of the expected solution, it becomes necessary to separate the phases before recovering the uranium. However, such separation has proved to be extremely difficult if not impossible, e.g., in the case of separation by filtration, since the pores of filtering substrate quickly become blocked by the fine particles.

SUMMARY OF THE INVENTION

Recognizing this difficulty and the above-mentioned disadvantages, applicant has carried out research on the basic causes of this phenomenon. He has found and then perfected a method of dissolving impure $UF_4$ which makes it easier to separate the solid and liquid phases of the suspension which results after dissolution.

The method of the invention, for dissolving impure uranium tetrafluoride in a hot state in a nitric acid solution in the presence of an aluminum compound, is characterized in that, for the purpose of obtaining a uranyl nitrate solution which can easily be separated from the solid phase formed during treatment, dissolving is carried out in two stages at an appropriate temperature. The first stage comprising introducing quantities of nitric acid and of the aluminum compound which are insufficient to dissolve the impure uranium tetrafluoride completely, and keeping the resultant suspension agitated for a period of at least 0.5 hour. The second stage comprising introducing quantities of nitric acid and the aluminum compound which are at least sufficient to dissolve the uranium not dissolved in the first stage, while keeping the suspension agitated.

In the method of the invention, the uranium tetrafluoride treated may emanate from processes where uranium is recovered from phosphoric acid by extraction with an appropriate solvent and re-extraction of the uranium with hydrofluoric acid, as described, e.g., in U.S. Pat. No. 2,866,680. This disclosure recommends using octylpyrophosphoric acid as the solvent for extracting the uranium. The impure uranium tetrafluoride may equally come from other sources, e.g., from some impure forms of $UF_4$ which are obtained when uranium oxide is fluoridated.

Various attempts were made to upgrade the uranium in the impure uranium tetrafluoride, such as using the well-known method of redissolving the uranium compound in nitric acid in the presence of an aluminum compound. However, applicant was then confronted with the appearance of a gel, suspended in the uranyl nitrate solution, which he was unable to separate. Applicant then tried to adjust the conditions under which the known process was carried out, by varying the temperature, dissolving time and relative proportions of reagents, but he never arrived at a suspension in which the constituents could easily be separated.

Applicant specifically found it impossible to obtain a uranyl nitrate solution which could easily be separated. He then found that, in contrast with prior art methods, it was necessary to dissolve the impure uranium tetrafluoride in two stages in order to achieve easy separation of the liquid and solid phases forming the suspension which resulted from the acid treatment in the presence of the aluminum compound.

DETAILED DESCRIPTION OF THE INVENTION

In the method of the invention, the total amount of aluminum compound in both stages for making the fluorine from the $UF_4$ form complexes, must be at least equal to the stoichiometric quantity corresponding to the formation of $AlF_6^{3-}$, and preferably from 1.15 to 1.50 times that quantity.

The total quantity of nitric acid required to dissolve the impure $UF_4$ in both stages is such that the free acidity at the end of the second stage must be at least 0.5 mole of $HNO_3$ per liter of solution, and preferably from 1 to 5 moles per liter of solution.

The amount of aluminum compound introduced during the first stage is at the maximum 0.95 times the stoichiometric quantity corresponding to the formation of $AlF_6^{3-}$ for the fluorine involved, but is preferably chosen within the range from 0.60 to 0.90 times that quantity.

The amount of nitric acid introduced at the first stage is at the maximum 0.9 times the quantity of nitric acid required to make the uranium in the $UF_4$ soluble, and is preferably from 0.5 to 0.75 times that quantity.

The temperature required to dissolve the $UF_4$ is chosen within the 60° C. to 110° C. range and preferably within the 70° C. to 90° C. range, for both stages.

The agitating time during the first stage is chosen so that the hydrated aluminum fluoride particles can reach an adequate size. The time chosen must be at least 30 minutes and is generally from one to 12 hours and preferably from one to five hours.

During the second stage, the agitating time has less effect on the separation of solid and liquid phases in the suspension obtained by dissolving the uranium fluoride; however, it must be long enough to enable the uranium to become soluble. For this purpose, it is generally chosen between 0.5 and 12 hours and preferably between one and five hours.

The aluminum compound which is used to make the fluoride ions from the uranium tetrafluoride form complexes is generally selected from the group comprising aluminum fluoride, aluminum nitrate, alumina, aluminum hydroxide, aluminum sulfate and aluminum compounds capable of forming a soluble aluminum fluoride complex. In practice, the aluminum compound is in most cases alumina or aluminum hydroxide, since these two products are the most widely available in industry.

The invention will be understood better from the examples which are given to illustrate it.

EXAMPLE 1

This is an example of a method of dissolving impure uranium tetrafluoride in one stage, as in the prior art.

For this purpose 1,000 g of impure $UF_4$, obtained from extraction of uranium from phosphoric acid, is treated with octylpyrophosphoric acid, which is re-extracted by means of hydrofluoric acid.

The impure, undried uranium tetrafluoride has the following composition, given as percentages by weight:

| | | |
|---|---|---|
| | Uranium | 15.7% |
| | Bonded fluorine | 9.4% |
| | Iron | 0.8% |
| | Calcium | 0.6% |
| | Free HF | 8.2% |
| | Phosphorus | 0.1% |
| | Humidity and various constituents | 65.2% |

This quantity of $UF_4$ is placed in a reactor and then treated with $Al_2O_3.3\ H_2O$, and commercial nitric acid containing 55% of $HNO_3$, at a temperature of 90° C. for four hours. The amount of alumina used is 1.15 times the stoichiometric quantity corresponding to the formation of $AlF_6^{3-}$ and the amount of nitric acid is 6 moles per mole of alumina introduced. Under these conditions the free acidity at the end of the reaction is 3 moles per liter.

A viscous suspension is thus obtained, and 12 hours were required to separate the constituent phases, by filtering through a filter cloth under vacuum.

EXAMPLE 2

This example, which illustrates the method of the invention, is concerned with dissolving the same uranium tetrafluoride as in Example 1, in two stages.

In the first stage of the process, 1,000 g of the impure $UF_4$ is placed in the same reactor as in Example 1, with an amount of alumina equal to 0.8 times the stoichiometric quantity corresponding to the formation of $AlF_6^{3-}$, and an amount of nitric acid corresponding to six moles per mole of alumina introduced. The reaction medium is kept agitated at a temperature of 90° C. for one hour.

In the second stage of the process, the following materials are placed in the reactor: an amount of alumina equal to 0.35 times the stoichiometric quantity corresponding to the formation of $AlF_6^{3-}$, and an amount of nitric acid equal to six moles per mole of alumina introduced during the second stage. The reaction medium is kept agitated at 90° C. for one hour. The free acidity, at the end of the reaction, is 2.98 moles of nitric acid per liter.

When both stages of the method of the invention are over, the suspension obtained is found to look very different from that in Example 1. The suspension requires only 12 minutes to separate the constituent phases, by filtering under vacuum using the same apparatus as in Example 1.

Thus there is found to be a considerable reduction in filtering time, although the total quantities of reagents used in this example are the same as those in Example 1, which was an illustration of prior art.

EXAMPLE 3

This example, which also illustrates the method of the invention, is concerned with dissolving the same uranium tetrafluoride as in the previous examples, in two stages.

In the first stage 1,000 g of $UF_4$ is treated under the same conditions and with the same quantities of reagents as in Example 2, except that the agitating time is three hours.

At the end of the first stage, the same quantities of reagents as in Example 2 are added for the second stage, and the agitating time is kept at one hour.

After this treatment in stages, the suspension obtained is separated by filtering in the same apparatus as in the previous examples. The separating operation takes only two minutes.

This again shows the importance of dissolving $UF_4$ in two stages, with a shortage of reagents during the first stage.

It will be understood that various changes may be made in the method of the invention without departing from the spirit of the invention, particularly as defined in the following claims.

I claim:

1. In a method of dissolving impure uranium tetrafluoride in a hot state in a nitric acid solution to which an aluminum compound has been added to complex the fluoride ions, the improvement comprising dissolving the tetrafluoride in two stages, the first stage comprising the steps of introducing a quantity of nitric acid that is at most 0.9 times the quantity of nitric acid required to solubilize the uranium tetrafluoride, introducing a quantity of the aluminum compound that is at most 0.95 times the stoichiometric quantity corresponding to the formation of $AlF_6^{3-}$, and agitating the resultant suspension during the first stage for a period of at least 0.5 hour, and the second stage comprising the steps of introducing a quantity of nitric acid such that the total quantity of nitric acid added during both of said stages results in a free acidity at the end of the second stage of at least 0.5 mole of nitric acid per liter of solution, adding a quantity of aluminum compound such that the total quantity of aluminum compound added during both of said stages is at least equal to the stiochiometric quantity corresponding to the formation of $AlF_6^{3-}$, and agitating the suspension during the second stage.

2. The method of claim 1, wherein the total amount of aluminum compound added is from 1.15 to 1.50 times the stoichiometric quantity required for the formation of $AlF_6^{3-}$.

3. The method of claim 1, wherein the total quantity of nitric acid added during both stages is such that the free acidity, at the end of the second stage, is from one to five moles per liter of solution.

4. The method of claim 1, wherein the temperature for dissolving the $UF_4$ is from 60° C. to 110° C.

5. The method of claim 1 wherein the agitating time during the first stage is from one hour to 12 hours.

6. The method of claim 1 wherein the agitating time during the second stage is from 0.5 hour to 12 hours.

7. The method of claim 1 wherein the aluminum compound is selected from the group comprising aluminum chloride, aluminum nitrate, aluminum sulfate, alumina and aluminum hydroxide.

8. The method of claim 1 wherein the amount of aluminum compound utilized in the first stage is from 0.60 to 0.90 of said stoichiometric quantity.

9. The method of claim 1 wherein the amount of nitric acid utilized in the first stage is from 0.50 to 0.75 times the quantity of nitric acid required to solubilize the uranium tetrafluoride.

10. The method of claim 4 wherein said temperature is from 70° C. to 90° C.

11. The method of claim 5 wherein said agitating time is from one hour to five hours.

12. The method of claim 6 wherein said agitating time is from one hour to five hours.

* * * * *

UNITED STATES PATENT AND TRADEMARK OFFICE
CERTIFICATE OF CORRECTION

PATENT NO. : 4,576,802
DATED : March 18, 1986
INVENTOR(S) : Antoine Floreancig

It is certified that error appears in the above-identified patent and that said Letters Patent is hereby corrected as shown below:

The following should be added to the Title Page:

-- [30] Foreign Application Priority Data
August 12, 1982 [FR] France ... 82 14352 --

Signed and Sealed this

Fifth Day of August 1986

[SEAL]

Attest:

DONALD J. QUIGG

Attesting Officer     Commissioner of Patents and Trademarks